United States Patent
Rahman

(10) Patent No.: US 11,924,655 B2
(45) Date of Patent: Mar. 5, 2024

(54) METHOD TO DYNAMICALLY ADJUST 4G LTE REFERENCE SIGNAL POWER TO MATCH 5G NR COVERAGE FOOTPRINT TO AVOID VOICE OVER 4G FALLBACK FAILURES FOR 5G SUBSCRIBERS

(71) Applicant: T-MOBILE INNOVATIONS LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 163 days.

(21) Appl. No.: 17/516,844

(22) Filed: Nov. 2, 2021

(65) Prior Publication Data
US 2023/0140564 A1   May 4, 2023

(51) Int. Cl.
*H04W 24/04* (2009.01)
*H04L 5/00* (2006.01)
*H04W 36/08* (2009.01)
*H04W 52/38* (2009.01)
*H04W 76/18* (2018.01)

(52) U.S. Cl.
CPC .......... *H04W 24/04* (2013.01); *H04L 5/0048* (2013.01); *H04W 36/08* (2013.01); *H04W 52/38* (2013.01); *H04W 76/18* (2018.02)

(58) Field of Classification Search
CPC ..... H04W 24/04; H04W 76/18; H04W 36/08; H04W 52/38; H04L 5/0048
See application file for complete search history.

(56) References Cited

U.S. PATENT DOCUMENTS

2016/0088677 A1\* 3/2016 Sridharan ............. H04W 36/14
                                                        455/452.1
2022/0007308 A1\* 1/2022 Xiong ................... H04W 52/38

\* cited by examiner

*Primary Examiner* — Derrick V Rose
(74) *Attorney, Agent, or Firm* — Shook, Hardy & Bacon L.L.P.

(57) ABSTRACT

Systems and methods are provided for dynamically adjusting a 4G LTE reference signal power level to match a 5G New Radio (NR) coverage footprint to avoid voice over 4G fallback failures for 5G subscribers. Initially, a subscriber making a voice call while in NR coverage may be directed to fall back to LTE in a process known as voice over evolved packet system fallback (VoEPSFB). If the LTE signal strength is worse due to non-optimal settings of the LTE reference signal, the subscriber experiences call setup failure. After the call setup failure, the UE transitions back to the gNodeB. Since the gNodeB knows the UE attempted to fall back to LTE (as well as how soon the UE transitioned back to the gNodeB), a notification is triggered that instructs the LTE base station to increase its reference signal power level.

20 Claims, 5 Drawing Sheets

METHOD TO DYNAMICALLY ADJUST 4G LTE REFERENCE SIGNAL POWER TO MATCH 5G NR COVERAGE FOOTPRINT TO AVOID VOICE OVER 4G FALLBACK FAILURES FOR 5G SUBSCRIBERS

SUMMARY

Embodiments of the technology described herein are directed to, among other things, systems and methods for a 5G standalone (SA) base station (gNodeB) to notify its 4G LTE base station counterpart (eNodeB) to dynamically adjust its transmit power level. Initially, a subscriber making a voice call while in New Radio (NR) coverage may be directed to fall back to LTE in a process known as voice over evolved packet system fallback (VoEPSFB). For example, the user may have user equipment (UE) or provided service by a gNodeB that lacks support to carry real-time services (e.g., a voice call) over NR. If the LTE signal strength is worse due to non-optimal settings of the LTE reference signal, the subscriber experiences call setup failure. After the call setup failure, the UE transitions back to the gNodeB. Since the gNodeB knows the UE attempted to fall back to LTE (as well as how soon the UE transitioned back to the gNodeB), a notification is triggered that instructs the LTE base station to increase its reference signal power level.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein.

DETAILED DESCRIPTION

Figure 1:
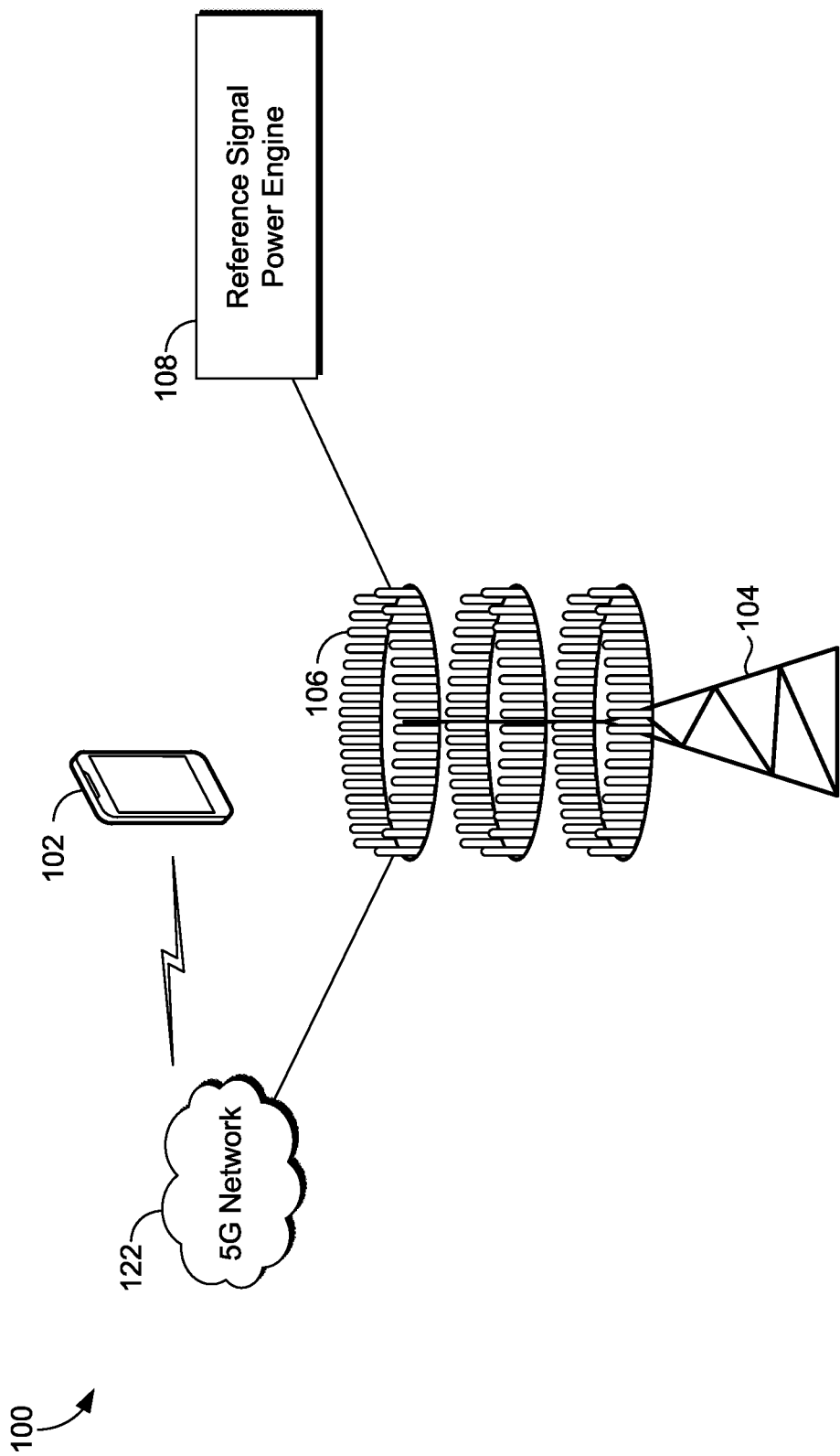
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| BRS | Broadband Radio Service |
| CD-ROM | Compact Disk Read Only Memory |
| CDMA | Code Division Multiple Access |
| EIRP | Equivalent Isotropically Radiated Power |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MD | Mobile Device |
| MIMO | Multiple-Input Multiple-Output |
| mMIMO | Massive Multiple-Input Multiple-Output |
| MMU | Massive Multiple-Input Multiple-Output Unit |
| NEXRAD | Next-Generation Radar |
| NR | New Radio |
| NSA | Nonstandalone |
| OOBE | Out-of-Band-Emission |
| PC | Personal Computer |
| PCS | Personal Communications Service |
| PDA | Personal Digital Assistant |
| RAM | Random Access Memory |
| RAT | Radio Access Technology |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RRU | Remote Radio Unit |
| RSRP | Reference Transmission Receive Power |
| RSRQ | Reference Transmission Receive Quality |
| RSSI | Received Transmission Strength Indicator |
| SA | Standalone |
| SINR | Signal-to-Interference-Plus-Noise Ratio |
| SNR | Transmission-to-noise ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, mMIMO/5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

The present disclosure is directed to systems, methods, and computer readable media that adjusting 4G LTE reference signal power to match 5G NR coverage footprint to avoid voice over 4G fallback failures for 5G subscribers. Initially, a subscriber making a voice call while in New Radio (NR) coverage may be directed to fall back to LTE in a process known as voice over evolved packet system fallback (VoEPSFB). For example, the user may have user equipment (UE) or provided service by a gNodeB that lacks support to carry real-time services (e.g., a voice call) over NR. If the LTE signal strength is worse due to non-optimal settings of the LTE reference signal, the subscriber experiences call setup failure. After the call setup failure, the UE transitions back to the gNodeB. Since the gNodeB knows the UE attempted to fall back to LTE (as well as how soon the UE transitioned back to the gNodeB), a notification is triggered that instructs the LTE base station to increase its reference signal power level.

According to aspects of the technology described herein, a method for adjusting a 4G LTE reference signal power level to match a 5G NR coverage footprint to avoid voice over 4G fallback failures for 5G subscribers is provided. The method comprises receiving an indication, at a gNodeB, that a UE attempting to transition to 4G LTE experienced a voice call setup failure at an eNodeB. The method also comprises determining the UE was instructed by the gNodeB to go through release with redirect to the eNodeB. The method further comprises, based on the voice call setup failure occurring within a predetermined time period and a pre- defined threshold being exceeded, communicating, by the gNodeB, to the eNodeB to dynamically adjust a 4G LTE reference signal power level.

According to further aspects of the technology described herein, one or more computer-readable media having computer-executable instructions embodied thereon that, when executed by at least one computing device, cause the computing device to perform operations for dynamically adjusting a 4G LTE reference signal power level to match a 5G NR coverage footprint to avoid voice over 4G fallback failures for 5G subscribers. The operations comprise receiving an indication, at a gNodeB, that a UE attempting to transition to 4G LTE experienced a voice call setup failure at an eNodeB. The operations also comprise determining the UE was instructed by the gNodeB to go through release with redirect to the eNodeB. The operations further comprise, based on the voice call setup failure occurring within a predetermined time period, communicating, by the gNodeB, to the eNodeB to dynamically adjust a 4G LTE reference signal power level.

According to even further aspects of the technology described herein, a system for dynamically adjusting a 4G LTE reference signal power level to match a 5G NR coverage footprint to avoid voice over 4G fallback failures for 5G subscribers. The system comprises a UE that receives instructions from a gNodeB to go through release with redirect to an eNodeB. The UE or the gNode B lacks Voice over New Radio (VoNR) support. The system also comprises the gNodeB that receives an indication that the UE attempting to transition to 4G LTE experienced a voice call setup failure at the eNodeB. The system further comprises the eNodeB that receives instructions from the gNodeB to dynamically adjust a 4G LTE reference signal power level based on the voice call setup failure occurring within a predetermined time period.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 5:
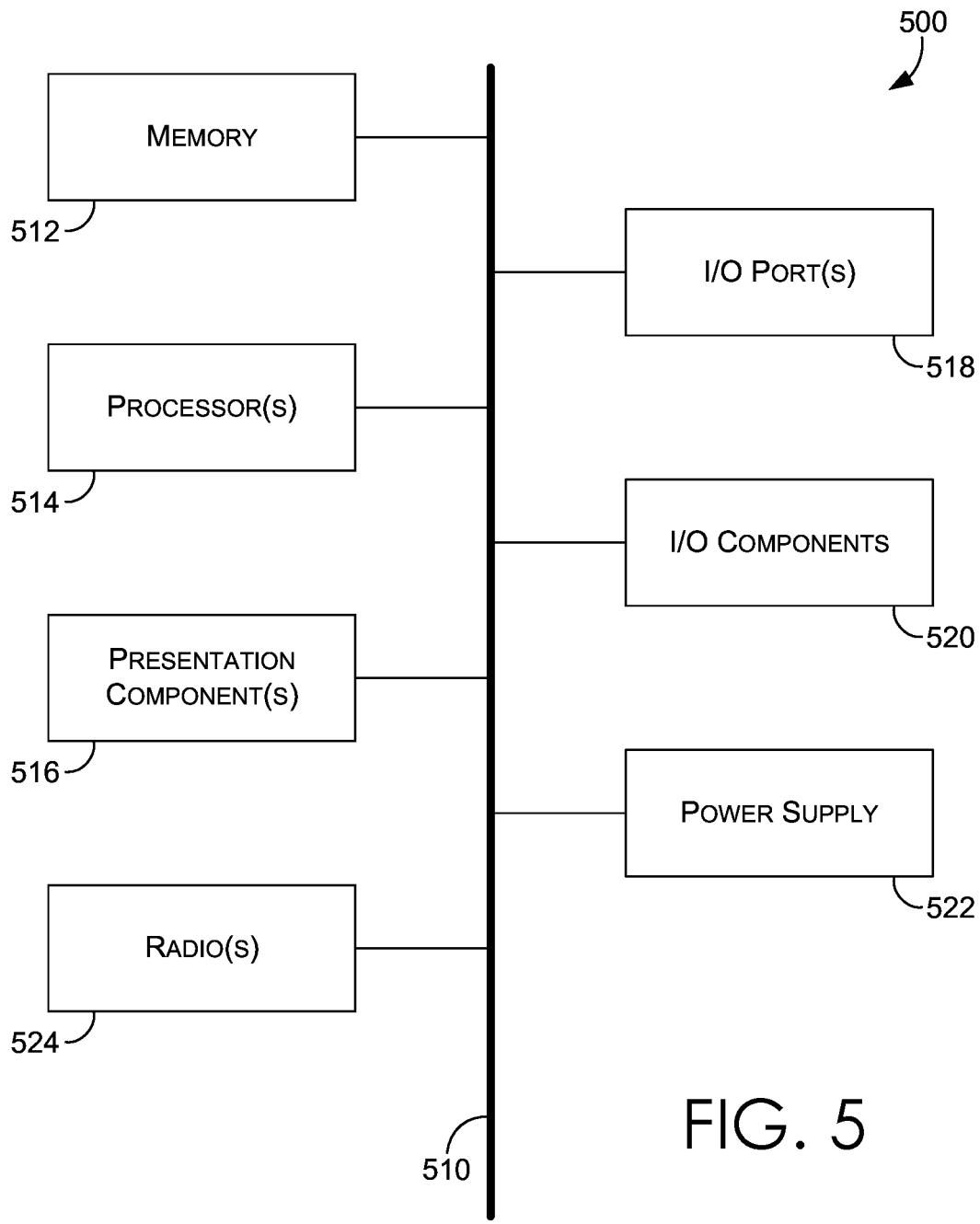
FIG. 5 depicts an example computing environment suitable for use in implementation of the present disclosure.

A network cell may comprise a base station to facilitate wireless communication between a communications device within the network cell, such as communications device 500 described with respect to FIG. 5, and a network. As shown in FIG. 1, a communications device may be a UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 512 in FIG. 5 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the UE 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include gNodeB for mMIMO/5G communications via network 122. In this way, the base station 104 can facilitate wireless communication between UE 102 and network 122.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

Continuing, the network environment 100 may further include a Reference Signal Power Engine 108. The Reference Signal Power Engine 108 may be configured to, among other things, dynamically adjusting a 4G LTE reference signal power level to match a 5G NR coverage footprint to avoid voice over 4G fallback failures for 5G subscribers, in accordance with the present disclosure. Though Reference Signal Power Engine 108 is illustrated as a component of base station 104 in FIG. 1, it may be a standalone device (e.g., a server having one or more processors), a service provided via the 5G network 122, or may be remotely located.

Figure 2:
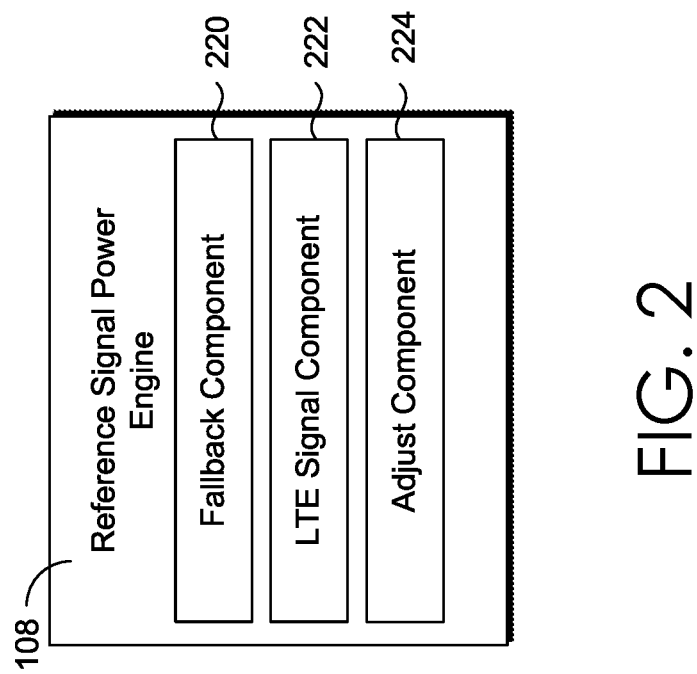
FIG. 2 illustrates a diagram of a reference signal power engine, in accordance with aspects herein.

Referring now to FIG. 2, the Reference Signal Power Engine 108 may include, among other things, fallback component 210, LTE signal component 222, and adjust component 224. The Reference Signal Power Engine 108 may receive, among other things, data from user devices, such as UE 102, within a network cell associated with a particular base station 104. Additionally or alternatively, the Reference Signal Power Engine 108 may receive, among other things, data from base station 104, such as data from a gNodeB or eNodeB.

The data received by the Reference Signal Power Engine 108 comprises information such as an indication a UE is going through Voice over Evolved Packet System Fallback (VoEPSFB) or Voice over 4G Fallback, each of which may also be described as Release with Redirect (RwR) to LTE. The data received by the Reference Signal Power Engine 108 may also comprise a threshold of RwR failures that may be set or configured by a network operator, a length of time indicating how soon each UE experienced a RwR failure after being instructed to RwR to LTE, and the like.

Fallback component 110 generally receives an indication that a UE has been instructed to go through RwR to LTE (i.e., the eNodeB). In embodiments, the gNodeB provides instructions to the UE to go through RwR to LTE when either the gNodeB or the UE lacks VoNR support.

LTE signal component 222 generally receives an indication the UE has attempted RwR to LTE. LTE signal component 222 may also determine the UE experienced a voice call setup failure at the eNodeB. For example, the LTE signal component 222 may determine the gNodeB did not receive a request at an access and mobility management function (AMF) of the gNodeB from a mobile management entity (MME) of the eNodeB for context corresponding to the UE. Based on that knowledge, and the knowledge that the UE was instructed to go through RwR to LTE, the LTE signal component infers that the voice call setup failed.

Adjust component 224 generally instructs the eNodeB to dynamically adjust a 4G LTE reference signal power level. For example, if a particular threshold of voice call setup failures is exceeded (within a predetermined time period), adjust component 224 instructs the eNodeB to incrementally increase its LTE reference signal power level. Once the number of failures begins decreasing, or the threshold is no longer exceeded, adjust component 224 may instruct the eNodeB to cease increasing or begin incrementally decreasing its LTE reference signal power level.

Figure 3:
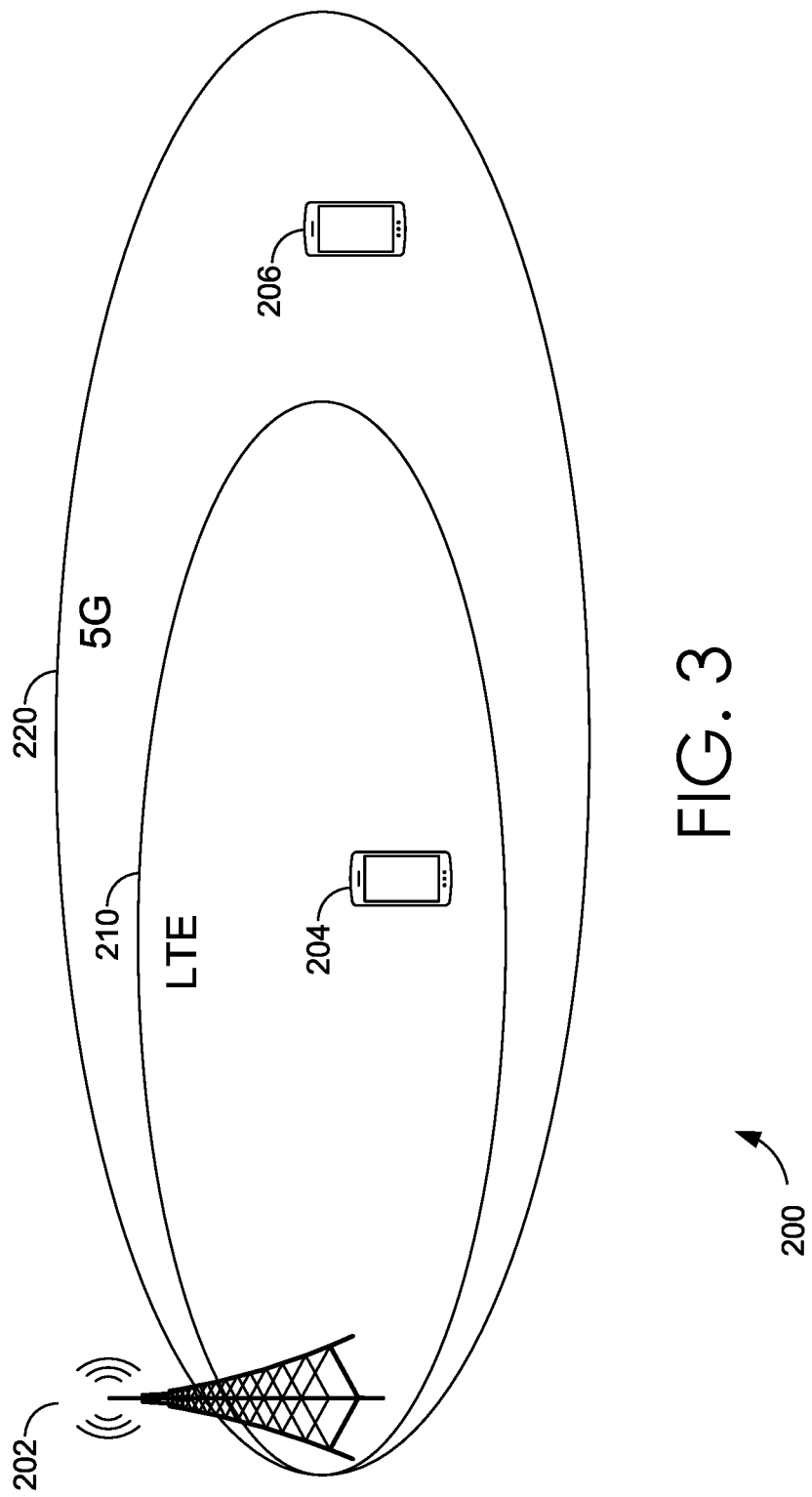
FIG. 3 illustrates an exemplary network diagram showing a UE that has successfully released with redirect to LTE and a UE that experienced call setup failure, in accordance with some aspects of the technology described herein.

For illustrative purposes only, FIG. 3 provides an exemplary network diagram 200 showing a UE 204 that has successfully released with redirect to LTE and a UE 206 that experienced call setup failure. Initially, UEs are in 5G coverage area 220 with service provided by base station 202. The base station may include a gNodeB and/or an eNodeB. Each of UEs 204, 206 may initiate a voice call. However, because the UEs or the gNodeB may lack VoNR services, the call cannot be completed in 5G. Accordingly, the gNodeB instructs the UE to RwR to LTE.

UE 204 is within the LTE coverage area 210 and successfully connects to LTE. However, the 4G coverage area 210 does not match the 5G coverage area 220 and UE 206 is unable to connect to LTE. As described herein, the base station 202 has knowledge that each UE 204, 206 was instructed to RwR to LTE and can also determine when those instructions were provided.

However, if the gNodeB does not receive a request at an AMF of the gNodeB from a MME of the eNodeB for context corresponding to the UE, then the gNodeB knows the RwR to LTE (the voice call setup) failed. As illustrated, this happens to UE 206 because the LTE reference signal power level is not strong enough.

Since the gNodeB knows when it provided the instructions to RwR to LTE, it can also determine if the failure occurred within a predetermined time period. As the gNodeB is providing services to multiple UEs, the gNodeB can also track whether a predefined threshold of failures is exceeded. If each of these conditions are satisfied, the gNodeB instructs the eNodeB to dynamically adjust the 4G LTE reference signal power level. This extends the 4G coverage area 210. The 4G LTE reference signal power level may be incrementally increased until the predefined threshold is no longer being exceeded, which may enable UE 206 to successfully connect to LTE.

Once the predefined threshold is no longer being exceeded, the gNodeB may cease providing instructions to the eNodeB to increase its 4G LTE reference signal power level. Moreover, in some aspects, the gNodeB may instruct the eNodeB to incrementally decrease its 4G LTE reference signal power level.

Figure 4:
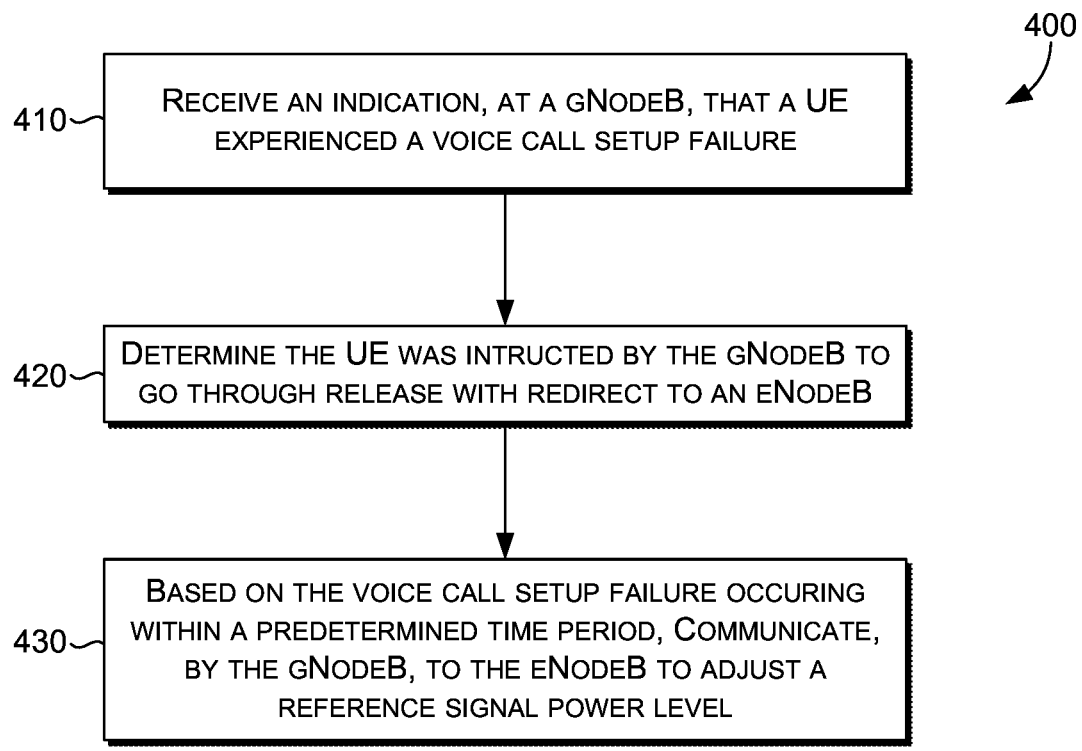
FIG. 4 is a flow diagram of an example method for dynamically adjusting 4G LTE reference signal power to match 5G NR coverage footprint to avoid voice over 4G fallback failures for 5G subscribers, in accordance with some aspects of the technology described herein.

Referring to FIG. 4, a flow diagram is provided depicting a method for dynamically adjusting a 4G LTE reference signal power level to match a 5G NR coverage footprint to avoid voice over 4G fallback failures for 5G subscribers, according to aspects of the technology described herein. Initially, and not shown by FIG. 4, a request may be received from a UE at an AMF of the gNodeB for a voice call. For clarity, the gNodeB corresponds to a SA 5G node and the UE may lack VoNR services. Accordingly, the gNodeB may instruct the UE to go through release with redirect to the eNodeB.

At step 410, and indication is received, at a gNodeB, that a UE attempting to transition to 4G LTE experienced a voice call setup failure at an eNodeB. In some aspects, the indication comprises not receiving a request at AMF of the gNodeB from a MME of the eNodeB for context corresponding to the UE. The gNodeB understands that the voice call setup failure likely indicates an LTE absolute radio frequency number (ARFCN) was not available for the UE to camp onto.

At step 420, it is determined the UE was instructed by the gNodeB to go through release with redirect to the eNodeB. Based on the voice call setup failure occurring within a predetermined time period and a predefined threshold being exceeded, the gNodeB communicates to the eNodeB, at step 430, to dynamically adjust a 4G LTE reference signal power level. In response, in some aspects, the 4TE LTE reference signal power level is dynamically adjusted. For example, the 4G LTE reference signal power level may be incrementally increased until the predefined threshold is no longer being exceeded. The predefined threshold may correspond to a configurable number of voice call setup failures.

In some aspects, the gNodeB determines the predefined threshold is no longer being exceeded (or the number of failures is decreasing). At this point, the gNodeB may cease instructing the eNodeB to increase its 4G LTE reference signal power level. Instead, the gNodeB may instruct the eNodeB to begin incrementally decreasing its 4G LTE reference signal power level.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE/WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for dynamically adjusting a 4G LTE reference signal power level to match a 5G NR coverage footprint to avoid voice over 4G fallback failures for 5G subscribers, the method comprising:
   receiving an indication, at a gNodeB, that user equipment (UE) attempting to transition to 4G LTE experienced a voice call setup failure at an eNodeB;
   determining the UE was instructed by the gNodeB to go through release with redirect to the eNodeB;
   based on the voice call setup failure occurring within a predetermined time period and a predefined threshold being exceeded, communicating, by the gNodeB, to the eNodeB to dynamically adjust a 4G LTE reference signal power level.

2. The method of claim 1, wherein the indication comprises not receiving a request at an access and mobility management function (AMF) of the gNodeB from a mobile management entity of the eNodeB for context corresponding to the UE.

3. The method of claim 1, further comprising receiving a request at an access and mobility management function (AMF) of the gNodeB for a voice call from a UE.

4. The method of claim 1, further comprising instructing, by the gNodeB, the UE to go through release with redirect to the eNodeB.

5. The method of claim 1, wherein the predefined threshold corresponds to a configurable number of voice call setup failures.

6. The method of claim 1, further comprising dynamically adjusting the 4G LTE reference signal power level.

7. The method of claim 6, wherein dynamically adjusting the 4G LTE reference signal power level comprises incrementally increasing the 4G LTE reference signal power level until the predefined threshold is no longer being exceeded.

8. The method of claim 1, wherein the UE or the gNodeB lacks Voice over New Radio (VoNR) support.

9. The method of claim 1, wherein the gNodeB corresponds to a SA 5G node.

10. The method of claim 9, further comprising determining the predefined threshold is no longer being exceeded.

11. The method of claim 10, further comprising incrementally decreasing the 4G LTE reference signal power level.

12. One or more non-transitory computer-readable media having computer-executable instructions embodied thereon that, when executed by at least one computing device, cause the computing device to perform operations for dynamically adjusting a 4G LTE reference signal power level to match a 5G NR coverage footprint to avoid voice over 4G fallback failures for 5G subscribers, the operations comprising:
receiving an indication, at a gNodeB, that user equipment (UE) attempting to transition to 4G LTE experienced a voice call setup failure at an eNodeB;
determining the UE was instructed by the gNodeB to go through release with redirect to the eNodeB;
based on the voice call setup failure occurring within a predetermined time period, communicating, by the gNodeB, to the eNodeB to dynamically adjust a 4G LTE reference signal power level.

13. The one or more non-transitory computer-readable media of claim 12, wherein the indication comprises not receiving a request at an access and mobility management function (AMF) of the gNodeB from a mobile management entity of the eNodeB for context corresponding to the UE.

14. The one or more non-transitory computer-readable media of claim 12, further comprising receiving a request at an access and mobility management function (AMF) of the gNodeB for a voice call from a UE.

15. The one or more non-transitory computer-readable media of claim 12, further comprising instructing, by the gNodeB, the UE to go through release with redirect to the eNodeB.

16. The one or more non-transitory computer-readable media of claim 12, wherein the predefined threshold corresponds to a configurable number of voice call setup failures.

17. The one or more non-transitory computer-readable media of claim 12, further comprising dynamically adjusting the 4G LTE reference signal power level.

18. The one or more non-transitory computer-readable media of claim 17, wherein dynamically adjusting the 4G LTE reference signal power level comprises incrementally increasing the 4G LTE reference signal power level until the predefined threshold is no longer being exceeded.

19. The one or more non-transitory computer-readable media of claim 12, wherein the UE or the gNodeB lacks Voice over New Radio (VoNR) support.

20. A system for dynamically adjusting a 4G LTE reference signal power level to match a 5G NR coverage footprint to avoid voice over 4G fallback failures for 5G subscribers, the system comprising:
user equipment (UE) that receives instructions from a gNodeB to go through release with redirect to an eNodeB, wherein the UE or the gNode B lacks Voice over New Radio (VoNR) support;
the gNodeB that receives an indication that the UE attempting to transition to 4G LTE experienced a voice call setup failure at the eNodeB; and
the eNodeB that receives instructions from the gNodeB to dynamically adjust a 4G LTE reference signal power level based on the voice call setup failure occurring within a predetermined time period.

\* \* \* \* \*